US007451918B2

(12) United States Patent
Vogt

(10) Patent No.: US 7,451,918 B2
(45) Date of Patent: Nov. 18, 2008

(54) BOOTH FOR PERFORMING FINANCIAL TRANSACTIONS

(75) Inventor: Paul J. Vogt, Highlands Ranch, CO (US)

(73) Assignee: The Western Union Company, Englewood, CO (US)

( * ) Notice: Subject to any disclaimer, the term of this patent is extended or adjusted under 35 U.S.C. 154(b) by 324 days.

(21) Appl. No.: 10/850,350

(22) Filed: May 19, 2004

(65) Prior Publication Data

US 2005/0258233 A1 Nov. 24, 2005

(51) Int. Cl.
*G06Q 40/00* (2006.01)
*G07D 11/00* (2006.01)
*G07F 19/00* (2006.01)

(52) U.S. Cl. .................................................... 235/379

(58) Field of Classification Search ......... 235/378–380, 235/386, 51–56; 705/5, 10, 13, 42, 43
See application file for complete search history.

(56) References Cited

U.S. PATENT DOCUMENTS 3,620,587 A * 11/1971 Ahmann ..................... 312/203
4,445,731 A * 5/1984 Ahmann ..................... 312/258
4,649,264 A * 3/1987 Carson ..................... 235/54 R
4,854,652 A * 8/1989 Ahmann .................. 312/140.2
5,152,491 A * 10/1992 Forster et al. ............... 248/454
5,218,528 A * 6/1993 Wise et al. .................... 705/12
5,600,114 A * 2/1997 Dunlap et al. ............... 235/379
5,666,765 A * 9/1997 Sarner et al. ................. 52/36.1
6,189,790 B1 * 2/2001 Walter ........................ 235/383
6,223,983 B1 * 5/2001 Kjonaas et al. ............ 235/379
6,474,547 B1 * 11/2002 Suzuki ....................... 235/379
6,488,203 B1 12/2002 Stoutenburg et al.
6,681,985 B1 * 1/2004 Curtin et al. ................ 235/379
2002/0079364 A1 * 6/2002 Davies ....................... 235/381
2003/0047605 A1 * 3/2003 McClure et al. ............ 235/396
2004/0056093 A1 * 3/2004 McClure et al. ............ 235/386

FOREIGN PATENT DOCUMENTS

JP 06245828 A * 9/1994

OTHER PUBLICATIONS

Four (4) photographs of Western Union transaction booths.

* cited by examiner

*Primary Examiner*—Kumiko C Koyama
(74) *Attorney, Agent, or Firm*—Townsend and Townsend and Crew LLP

(57) ABSTRACT

The present invention involves booths for performing financial transactions which are particularly accessible by wheelchair users or other handicapped individuals. In one embodiment, a transaction staging booth includes a staging surface and at least one leg for holding the staging surface to accommodate a user in a wheelchair. The booth includes one or more transaction interfaces. The transaction interface is adapted to provide an instruction set to the user for performing a financial transaction. In this manner, the physical structure of the transaction staging booth provides readily available access for both handicapped and non-handicapped users.

28 Claims, 6 Drawing Sheets

BOOTH FOR PERFORMING FINANCIAL TRANSACTIONS

BACKGROUND OF THE INVENTION

The present invention relates generally to booths from which financial transactions may be staged, and more specifically, to ADA compliant booths for allowing wheel chaired or other handicapped users to perform financial transactions.

The American Disabilities Act (ADA) was designed to provide more routine access for handicapped users to a wide range of public and private structures. For example, handicap parking spaces were created in close proximity to stores, office buildings, and the like. Restrooms were reconfigured or made to accommodate support rails and extra wide stall doors. Ramps provide access to public buildings for wheelchair users, and others, without the need for ascending or descending stairs. The ADA has greatly increased public access for handicapped individuals, and has wide ranging emotional and psychological benefits as well.

However, once inside the office buildings, stores or restaurants, the tables, chairs, counters, and the like are not necessarily adapted for handicapped customers. For example, bank service counters often are at a height to accommodate an average sized standing adult, but may not easily accommodate shorter individuals, children, or individuals in a seated position, such as in a wheelchair. Further, restaurant tables may not be specifically designed to accommodate users in wheelchairs. As a result, the user may not be able to sit sufficiently close to the table, counter, or the like to perform desired functions such as eating or writing. Improvements are always desired.

BRIEF SUMMARY OF THE INVENTION

The present invention relates generally to booths from which financial transactions may be staged, and more specifically, to ADA compliant booths for allowing wheel chaired or other handicapped users to perform financial transactions. In one embodiment of the present invention, an exemplary transaction staging booth includes a staging surface and at least one leg for holding the staging surface to accommodate a user in a wheelchair. The booth includes a transaction interface. The transaction interface is adapted to provide an instruction set to the user for performing the transaction. In a particular embodiment, the instruction set includes instructions for performing a financial transaction. In this manner, the physical structure of the transaction staging booth provides readily available access for both handicapped and non-handicapped users.

In alternative aspects of the present invention, the transaction interface may include a number of different devices or systems. In one embodiment, the transaction interface comprises a telephone. This may be useful, for example, for providing a direct connection to a customer service representative who then can provide instructions to the user for initiating or completing a desired financial transaction. In one aspect, the transaction interface, such as the telephone, is ADA compliant. The transaction interface may include, for example, a volume control. In another aspect, the transaction interface comprises a screen adapted to visually display the instruction set to the user. The instructions may be provided by a computer memory coupled to the screen for visual display on the screen. Alternatively, the screen may provide a visual interpretation of instructions received over the telephone. The instructions received over the telephone may include spoken instructions from a customer service agent, pre-recorded instructions, and the like. The memory coupled to the screen may include a plurality of additional instruction sets for performing a number of other financial transactions.

In one embodiment, the transaction interface is adapted to provide the instruction set in a plurality of languages. This feature may be useful, for example, for emigrants who can not read and/or write, or have limited reading and/or writing abilities. In one aspect, the instruction set is provided in a language selected by the user from the plurality of available languages. In another aspect the transaction interface comprises a speaker coupled to an audio source for audibly providing the instruction set to the user. Such an aspect may be particularly useful for individuals who have restricted or limited sight, or are blind. In another aspect the transaction interface comprises a braille pattern on the staging surface. The braille pattern may include a portion of the instruction set, or may provide instructions regarding use of a second transaction interface such as a nearby telephone, an audio device, or the like.

In some aspects, the staging booth includes one or more additional components such as a storage receptacle, a privacy shield and the like. In one aspect, the privacy shield includes a receptacle adapted to hold a paper version of the instruction set. In a particular aspect the paper version of the instruction set is a portion of the transaction interface. In particular aspects, the staging booth further includes at least a second transaction interface. Again, the second transaction interface may be selected from a telephone, a screen, a speaker, a braille pattern, or the like. In this manner, the transaction staging booth is adapted to accommodate users having a variety of sensory handicaps.

Other objects, features and advantages of the present invention will become more fully apparent from the following detailed description, the appended claims, and the accompanying drawings.

DETAILED DESCRIPTION OF THE INVENTION

Figure 1:
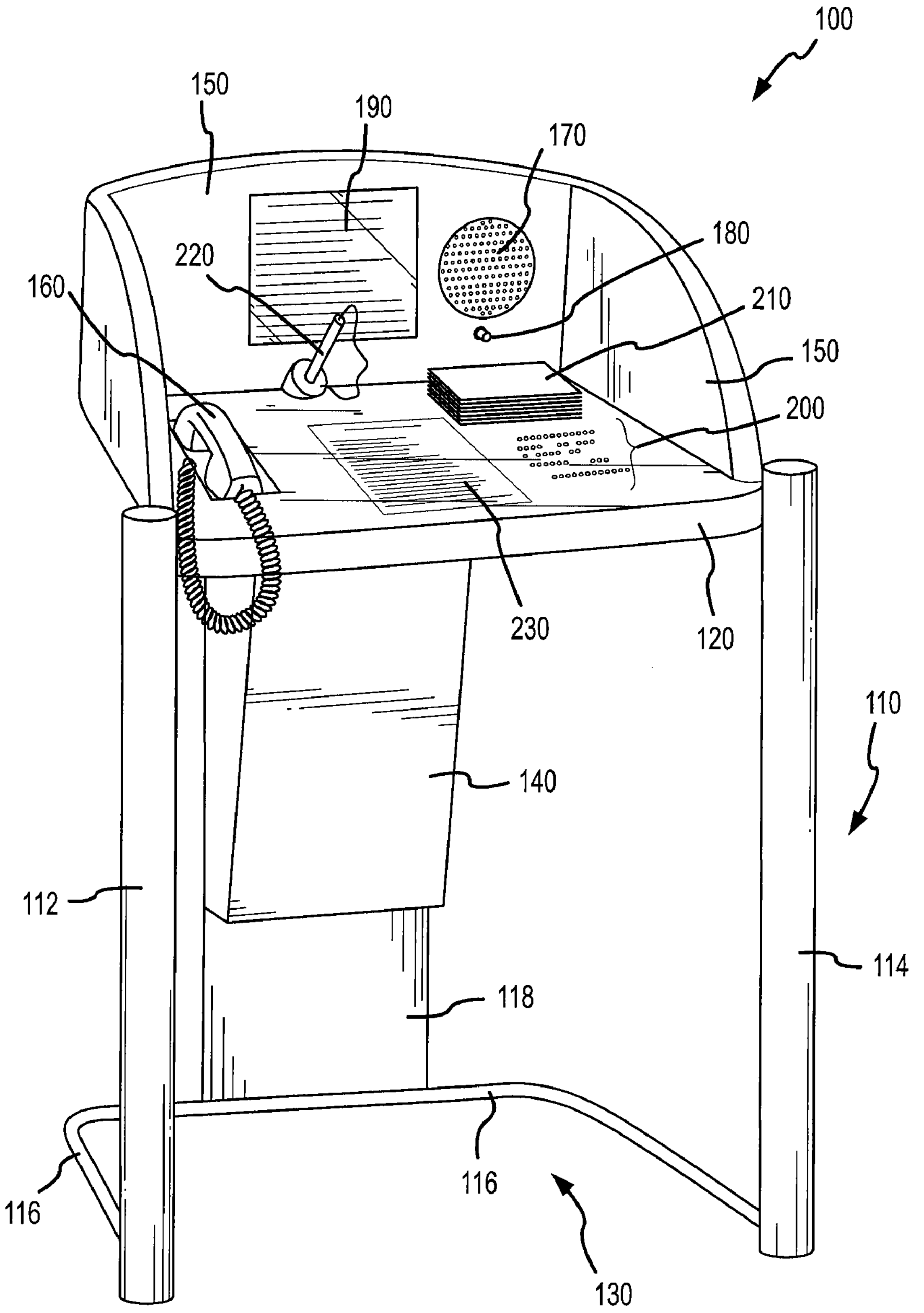
FIG. 1 is an overall view of a transaction staging booth according to an embodiment of the present invention.
Figure 2:
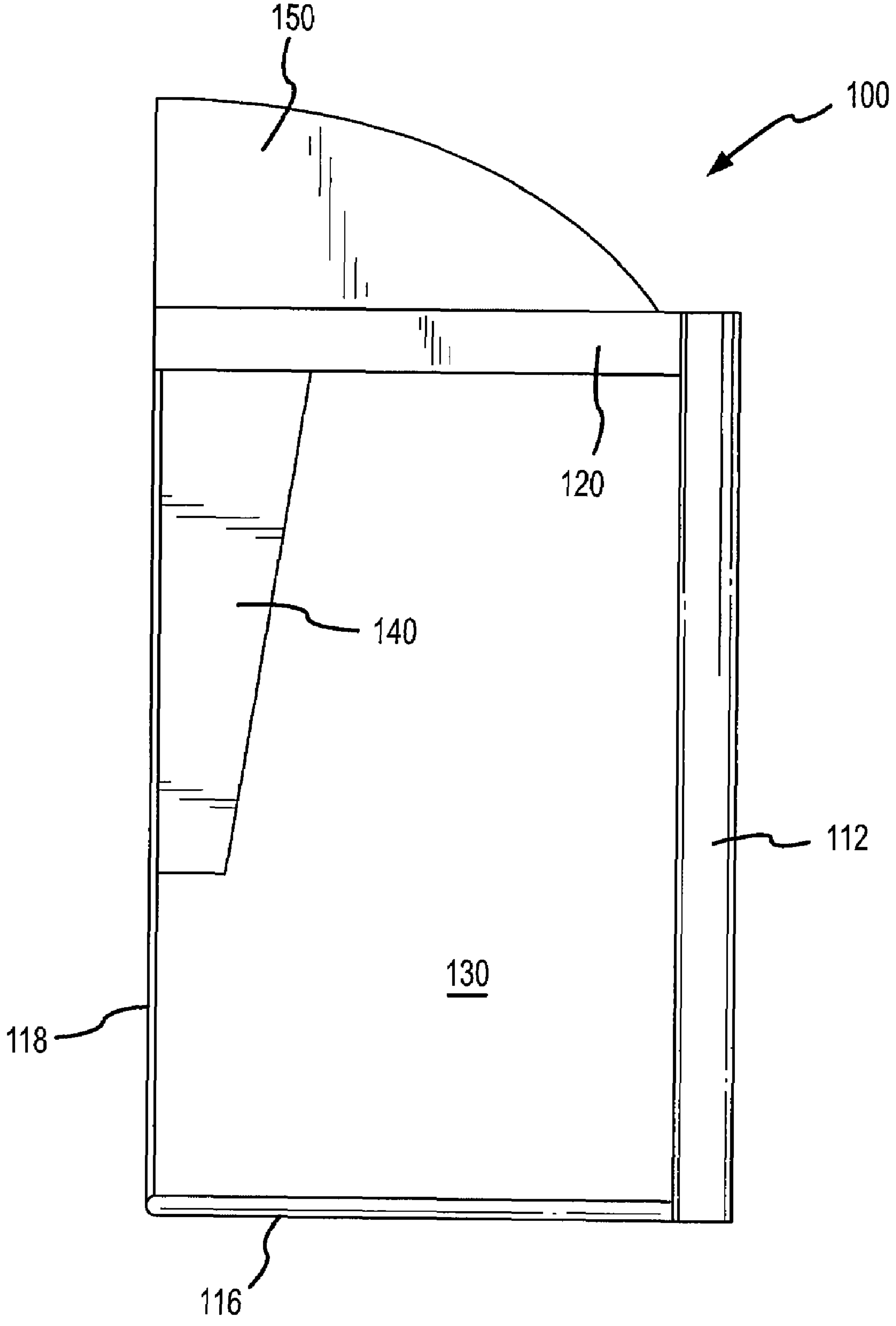
FIGS. 2 and 3 are a right side view and a rear view, respectively, of the transaction staging booth of FIG. 1.
Figure 3:
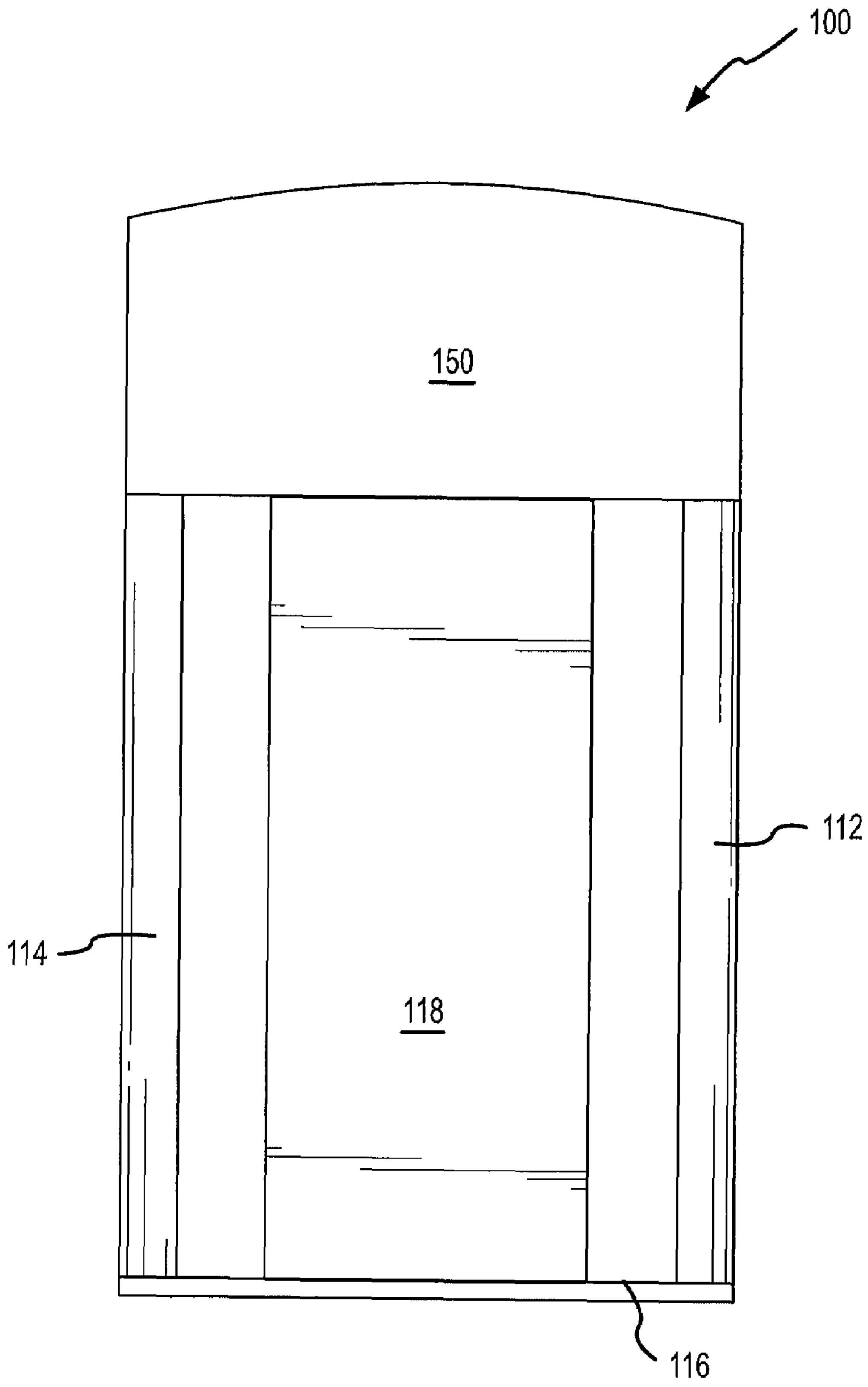

FIGS. 1-3 depict a transaction staging booth 100 according to an embodiment of the present invention. Booth 100 includes a staging surface 120 supported by a support structure 110. Support structure 110 includes at least one leg adapted to hold staging surface 120 at a desired orientation, height, or the like. In one embodiment, support structure 110 includes first and second legs 112, 114, coupled to a side or bottom portion of staging surface 120. In one embodiment, support structure 110 further includes a base 116 as best seen in FIG. 1. Base 116 may be coupled to the lower portion or bottom of legs 112 and 114. A back support 118 couples a portion of base 116 to staging surface 120. In this manner, support structure 110 provides a stable staging surface 120.

In one embodiment, staging surface 120 is adjustable relative to support structure 110. In one aspect, legs 112, 114 and/or back support 118 have a plurality of spaced holes into which one or more pins, pegs, posts or the like are at least partially received. In one embodiment, staging surface 120 rests on a portion of the pins, pegs, posts or the like which extend from the holes in legs 112, 114 and/or back support 118. The height of staging surface 120 can be adjusted by placing the pins in the desired holes in legs 112, 114 and/or back support 118, and then setting staging surface 120 on the pins. In one embodiment, a lever, tab, button or the like is coupled to one or more pins by way of a spring or other resilient member, or a rod or other generally stiff member. In this manner, pulling on the lever retracts the pins from the holes, to adjust the height of staging surface 120.

In another embodiment, the front edge of staging surface 120 may be lowered relative to back support 118. In this embodiment, the rearmost edge of staging surface 120 is rotatably coupled to the top of back support 118, such as by a hinge or the like. Legs 112 and 114 again may have a plurality of holes into which pins, pegs, posts or the like are at least partially received. By placing the pins into holes in legs 112 and 114 that are lower than the hinge or pin location in back support 118, the front edge of staging surface 120 may be angled downward. This may be beneficial, for example, when booth 100 is used by seated users, or by short individuals. In this embodiment, staging surface 120 may further include a lip or edge (not shown) which generally extends along the front edge of staging surface 120. This lip or edge may help prevent items from rolling or sliding off staging surface 120 when staging surface 120 is in an angled position. It will be appreciated by those skilled in the art that other devices may be used to adjust the height and/or angular relation of staging surface 120 within the scope of the present invention. Further, other mechanisms for coupling staging surface 120 to legs 112, 114 and/or back support 118 also fall within the scope of the present invention.

Support structure 110 may comprise a wide range of materials, including various metals such as aluminum, wood, and the like. Further, support structure 110 may have different physical configurations than that shown in FIGS. 1-3. For example, support structure 110 may comprise different numbers and/or combinations of legs 112-114, bases 116, and back supports 118. Staging surface 120 also may comprise a wide range of materials, including various metals such as aluminum, wood, ceramic, Formica, and the like. Staging surface 120 further may have a different shape than depicted in FIGS. 1-3.

In a particular embodiment, support structure 110 defines an opening 130 under staging surface 120. In the embodiment shown in FIGS. 1-3, a receptacle 140 is further provided. In one embodiment receptacle 140 is coupled to back support 118 and/or to staging surface 120. Receptacle 140 may be an open receptacle adapted to store various items, with the opening accessible from the front, side or rear of booth 100. Receptacle 140 may be an angled receptacle, or may have different shapes. In one embodiment, receptacle 140 is positioned relative to opening 130 such that a wheelchair user still fits within opening 130 and is able to use staging surface 120 without interference from receptacle 140.

In one embodiment booth 100 includes a privacy shield 150 that is coupled to an upper surface of staging surface 120, and/or to an edge of staging surface 120. In one embodiment, privacy shield 150 is adapted to extend at least one-half of the way around the periphery or edge of staging surface 120. In this manner, users of staging surface 120 have at least some privacy. Privacy shield 150 may comprise similar materials as staging surface 120 such as a wood, metal, ceramic, laminated materials such as Formica, and the like. Privacy shield 150 also may be made from other opaque or translucent materials within the scope of the present invention.

Transaction booth 100 preferably is adapted for facilitating financial transactions, including transactions disclosed in U.S. Pat. No. 6,488,203, issued Dec. 3, 2002, assigned to the assignee of the present invention, the complete disclosure of which is incorporated herein by reference for all purposes. For example, booth 100 may be used to prepare or complete the appropriate financial forms for the transfer of funds from one location to another.

In a particular embodiment, booth 100 includes one or more transaction interfaces to facilitate the financial transaction. The transaction interface may be embodied in a number of different mechanisms, including without limitation, a telephone, a speaker, a screen, a braille pad, or the like. In the embodiment shown in FIGS. 1-3, booth 100 includes a telephone 160. In one embodiment, telephone 160 is not a standard telephone that permits calls to various locations, but instead is directly connected to a customer service representative or agent. In this manner, removing telephone 160 from its cradle or nest automatically connects the user to the customer service agent. The agent then communicates to the user various instructions for initiating or completing financial transactions, including without limitation, an instruction set for filling out financial transaction forms. In another embodiment, the telephone has an ADA compliant volume control feature to allow a user to increase or decrease the telephone receiver volume.

Booth 100 is adapted to accommodate users having various handicaps. For example, in one embodiment booth 100 includes a speaker 170. Speaker 170 is adapted to provide audible instructions to a user. This may occur in several ways within the scope of the present invention. In one embodiment, speaker 170 provides a speaker phone function for telephone 160. In this manner, the user, once connected to the customer service agent via telephone 160, can set the telephone receiver down and use both hands to hold or fill out various forms while the customer service agent interacts audibly with the user through speaker 170. In one aspect, speaker 170 further includes a microphone capability.

In another embodiment, speaker 170 is coupled to a computer memory, and the user receives instructions for filling out various financial forms from the user memory. Such an embodiment may be operable without the use of phone 160. Further, the user may use telephone 160 to contact the customer service agent with any questions not otherwise answered in the instruction set saved in memory. Speaker 170 will be useful, for example, for vision impaired customers. Speaker 170 in one embodiment includes a volume control, and will thus be helpful for users with limited or diminished hearing ability.

In one embodiment, booth 100 includes a user input device 180, such as a button, a roller ball, a track ball, a toggle switch, or the like. Input device 180 may be used to initiate receipt of instructions from speaker 170. In one embodiment, the instructions for filling out various financial forms are stored in a plurality of languages including, without limitation, English, French, Spanish, Arabic, Italian, German, and the like. In one embodiment, the user interacts with user input device 180 to toggle through the plurality of languages until a desired language is reached. This may occur, for example, by first pressing user input device 180 to begin a short recording in each language stored in the memory. The short recording prompts the user to press input device 180 again when the desired language is heard. Alternatively, the user toggles through the languages using input device 180, stopping when a desired language is reached. In still another embodiment, the user is audibly prompted to first select a desired language for playback of the instruction set. Once the language is chosen, the instruction set is audibly played in the selected language. Such a feature will be particularly useful for emigrants who cannot, or have limited ability to, read or write. In this manner, the user can fill out the desired financial transaction forms, or listen to the instructions. In one embodiment, written instructions are provided with booth 100 for the use of user input device 180, and speaker 170.

In another embodiment, booth 100 further includes a screen 190 as shown in FIG. 1. Screen 190 may include a computer screen coupled to a computer memory. The computer memory may comprise a wide range of storage media, including media for storing information in analog or digital form. Computer screen 190 may be operated in several ways within the scope of the present invention. For example, in one embodiment computer screen 190 is coupled to telephone 160, so that instructions from the customer service agent are displayed on computer screen 190. Such an embodiment will be particularly useful for hearing impaired users of booth 100. Instructions displayed on screen 190 may include the spoken words of the customer service agent converted into written text by a voice recognition program stored in the computer memory. In this embodiment, a processor may be included to operate the program and direct the display of the written text. In another embodiment, the instructions displayed on screen 190 are converted from pre-recorded text sent to booth 100 via telephone 160. Again, a processor may operate to display the text on screen 190, as would be known to those skilled in the computer arts.

In one embodiment, screen 190 operates in conjunction with user input device 180. In this manner, the user may select a desired instruction set displayed on the screen by providing the appropriate input (pressing, rolling, or the like) to input device 180. In another embodiment, user input device 180 allows the user to scroll through characters depicted on screen 190. This may again be useful for costumers who desire the instruction set to be displayed in a preferred language. In another embodiment, screen 190 displays the instructions for use of user input device 180. In still another embodiment, screen 190 is a touch screen, and therefore acts as user input device 180. The user interacts with screen 190 by touching the screen to, for example, select a desired instruction set, select a preferred language, input information into desired financial forms, and the like.

In another embodiment, screen 190, in addition to or in place of the above noted functions, is used to display advertisements for various financial transactions. This may be useful, for example, in the event booth 100 is used for a plurality of different types of financial transactions. In another embodiment screen 190 is used to display advertisements from various retailers or service providers. In this manner, a portion or all of screen 190 may be leased out to desired advertisers.

In one embodiment, booth 100 is adapted for use by vision impaired or blind customers. In this embodiment, a braille pattern 200 is disposed on staging surface 120. Braille pattern 200 may, for example, contain instructions for use of telephone 160, user input device 180, speaker 170, or the like. In a particular embodiment, a vision impaired customer would read braille pattern 200, which directs the customer to pick up the telephone. Once connected to the customer service agent, or a recorded instruction set, the customer receives the audible instructions for filling out various financial forms or the like.

In a preferred embodiment, a plurality of financial transaction forms 210 are included with booth 100. Forms 210 may include a plurality of different forms for use with a variety of financial transactions. Alternatively, forms 210 is a stack of a same form for use with a particular financial transaction. In one embodiment, booth 100 further includes one or more writing utensils 220, such as a pen, a pencil, or the like coupled to booth 100. In one embodiment, a sheet of written instructions 230 is disposed on staging surface 120 or under a cover overlying at least a portion of staging surface 120. This may occur, for example, by having a laminated or other page containing instructions for the operation of user input device 180, telephone 160, speaker 170 or the like.

While screen 190 and speaker 170 are depicted coupled to or as a portion of privacy shield 150, screen 190 and speaker 170 may be disposed in staging surface 120 in another embodiment. The processor and computer memory also may reside in privacy shield 150, in receptacle 140, or the like.

Figure 4:
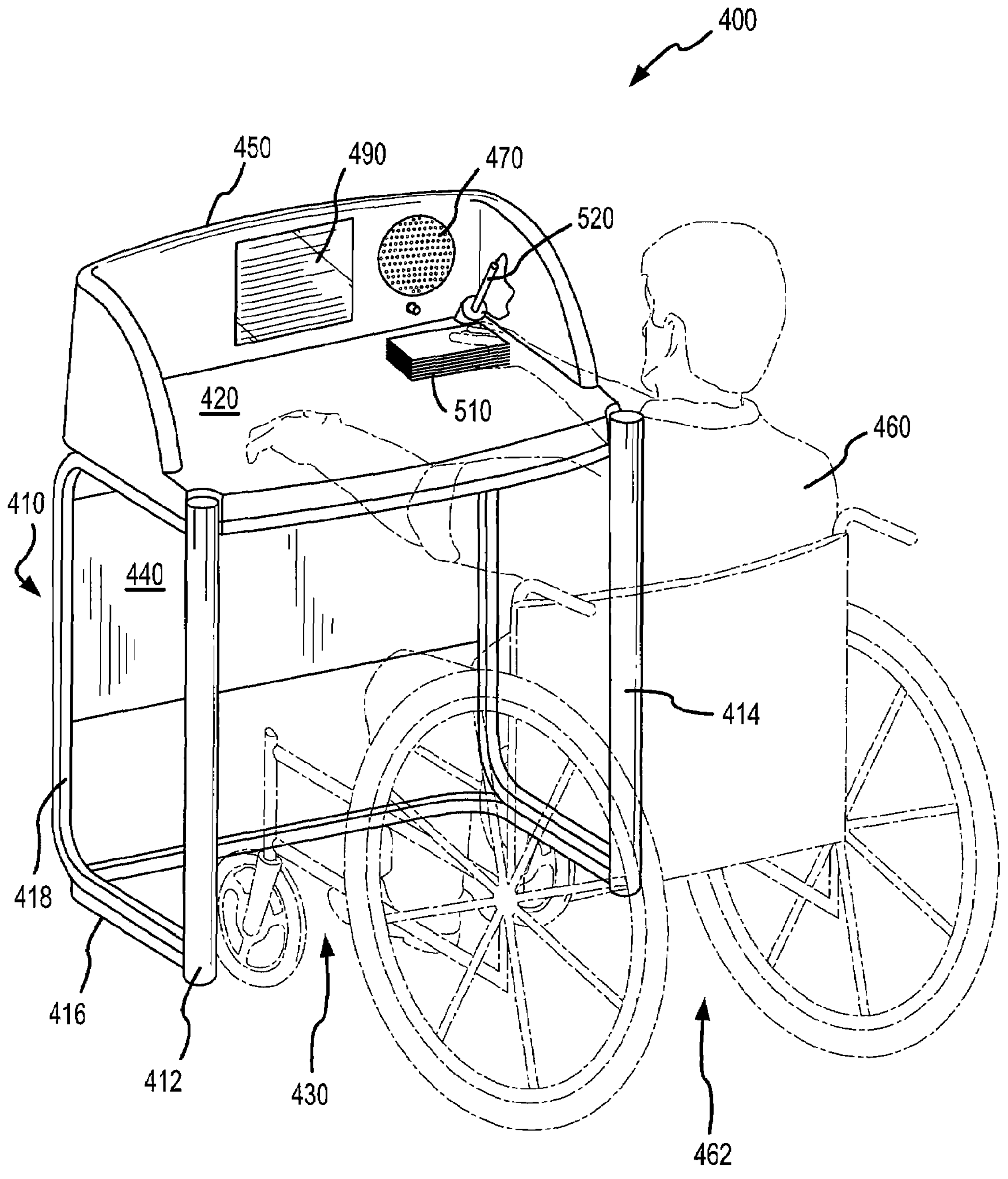
FIG. 4 depicts an alternative embodiment of a transaction staging booth according to the present invention showing a user in a wheelchair.
Figure 6:
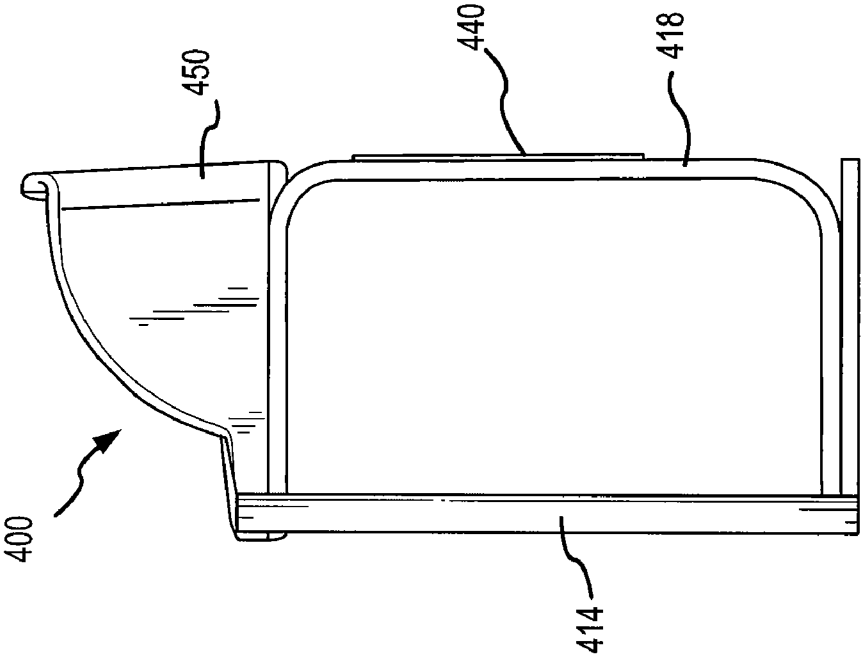
FIGS. 5 and 6 depict a front view and a left side view, respectively, of the transaction staging booth depicted in FIG. 4.
Figure 5:
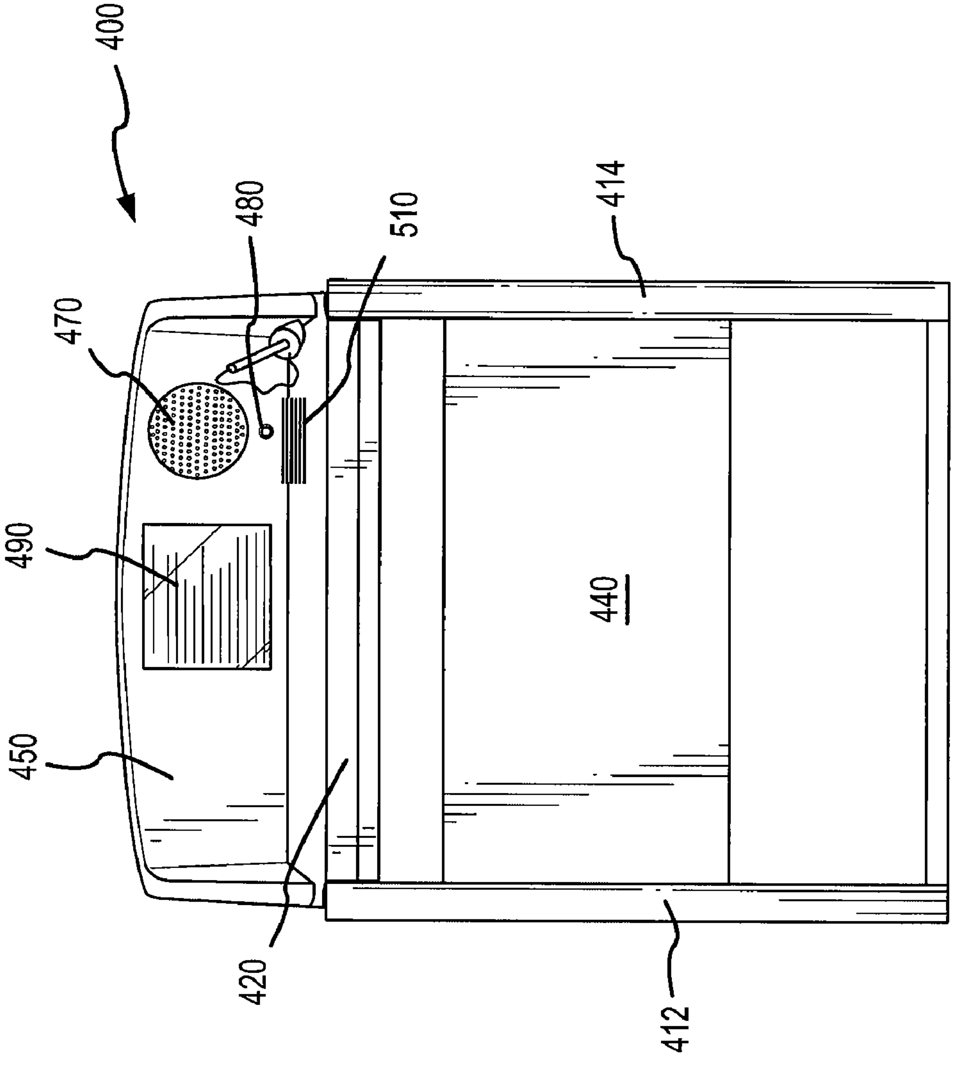

Turning now to FIGS. 4-6, an alternative transaction staging booth 400 embodiment of the present invention will be described. As best shown in FIG. 4, transaction staging booth 400 includes a support structure 410 for supporting a staging surface 420 similar to those described in conjunction with FIGS. 1-3. Support structure 410 may include one or more legs 412, 414, that may be coupled to a base 416. In this embodiment, a back support 418 is coupled to base 416 and extends upward to contact an underside of staging surface 420. A kick plate or modesty panel 440 is coupled to base 416 and/or to back support 418 to further stabilize support structure 410. In this embodiment, support structure 410 defines an opening 430 under staging surface 420 that is adapted to receive a wheelchair user 460. In a preferred embodiment, support structure 410 is adapted to receive a widest portion of a wheelchair 462. In this manner, wheelchair user 460 is able to be as close to staging surface 420 as they desire.

In one embodiment, a distance between the inside of leg 412 and the inside of leg 414 is about thirty inches (30.0 in). In another embodiment, the distance between the insides of legs 412 and 414 is between about twenty-five inches (25.0 in.) and about thirty-five inches (35.0 in.). In this manner, opening 430 is of sufficient width to accommodate wheelchair 462. In one embodiment, the distance between the front of legs 412 and 414, and modesty panel 440 is about twenty inches (20.0 in.). In another embodiment, the distance between a line drawn between legs 412 and 414, and modesty panel 440 is between about eighteen inches (18.0 in.) and about twenty-four inches (24 in.). In this manner, opening 430 is of sufficient depth to accommodate wheelchair 462. In one embodiment, staging surface 420 is positioned to be about thirty inches (30.0 inches) above the floor or other surface on which support structure 410 rests. In another embodiment, staging surface 420 is positioned to be between about twenty-four inches (24.0 in) and about thirty-six inches (36.0 in.) above the floor or other surface on which support structure 410 rests. In this manner, opening 430 is of sufficient height to accommodate wheelchair 462.

In various embodiments, booth 400 includes some or all of the similar features described in conjunction with FIGS. 1-3. In one embodiment, booth 400 includes a privacy shield 420, a speaker 470, a screen 490, a writing utensil 420, an angled staging surface 420, and/or a stack of financial transaction forms 510. In some embodiments, the functions of each of these components is the same as or similar to the comparable component described in conjunction with FIGS. 1-3. Further, while not shown in FIG. 4, booth 400 may include other transaction interfaces such as a telephone and a braille pad, a receptacle such as receptacle140, a processor and memory, and other components.

Figure 7:
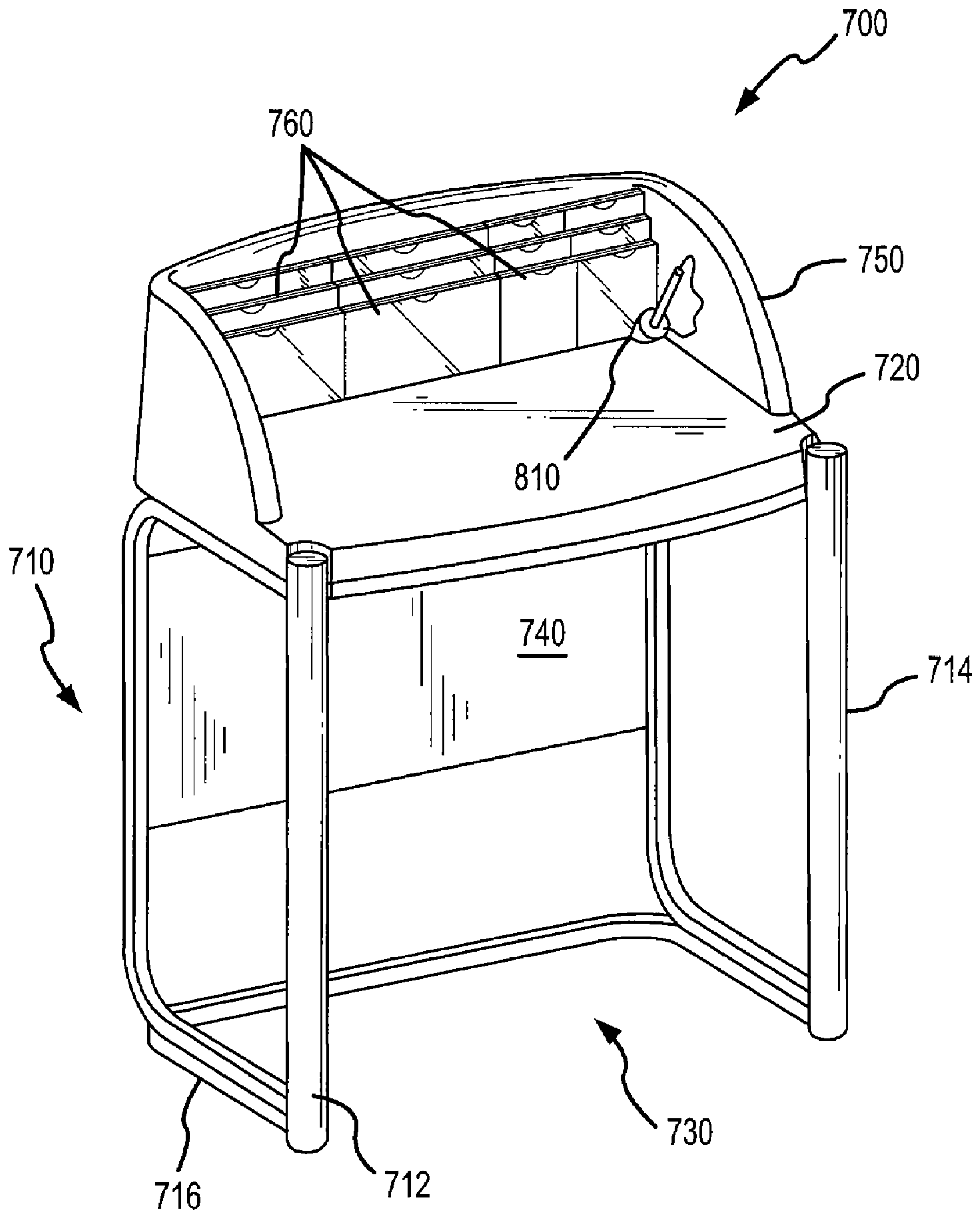
FIG. 7 depicts still another embodiment of a transaction staging booth according to the present invention.

Turning now to FIG. 7, still another embodiment of the present invention will be described. FIG. 7 depicts a transaction staging booth 700 having a staging surface 720. Staging surface 720 is supported by a support structure 710 so that booth 700 is adapted to accommodate a wheelchair user. Support structure 710 may comprise a single leg, or a plurality of legs. In the embodiment shown in FIG. 7, support structure 710 includes first and second legs 712, 714, a base 716, and a kick plate 740. Support structure 710 defines an opening 730 adapted to receive the wheelchair user of booth 700. A shield 750 is coupled to or rests on an upper surface or periphery of staging surface 720. In this embodiment, a plurality of receptacles 760 are disposed along at least a portion of shield 750. Receptacles 760 are adapted to receive one or more different financial transaction forms for facilitating desired financial transactions, including those disclosed in U.S. Pat. No. 6,488,203, previously incorporated herein by reference. Booth 700 may further include other components similar to booths 100 and 400, such as writing utensil 810.

The invention has now been described in detail. However, it will be appreciated that the invention may be carried out in ways other than those illustrated in the aforesaid discussion. Further, features described in conjunction with one embodiment may be applicable to other embodiments. Accordingly, the scope of this invention is not limited by those specific examples, but rather is to be accorded the full scope represented in the following claims.

What is claimed is:

1. A transaction staging booth, comprising:

a staging surface;

at least one leg to hold the staging surface to accommodate a user in a wheelchair when using the staging surface, wherein the at least one leg defines an opening under the staging surface, the opening configured to receive a lower portion of the wheel chair;

a storage receptacle extending directly from the underside of the staging surface, wherein the storage receptacle is configured to store objects simultaneous with the lower portion of the wheelchair being at least partially received in the opening; and a transaction interface to provide a first instruction set to the user, wherein:

the first instruction set comprises instructions for performing a financial transaction;

the transaction interface comprises a second instruction set which includes a braille pattern on the staging surface; and the braille pattern comprises at least a portion of the first instruction set;

wherein the top side of the staging surface defines at least one receptacle to hold a paper version of the first instruction set.

2. The transaction staging booth as in claim 1 wherein the transaction interface comprises a telephone.

3. The transaction staging booth as in claim 1 wherein the transaction interface comprises a screen to visually display the instruction set to the user.

4. The transaction staging booth as in claim 3 wherein the screen is configured to receive the first instruction set from a memory, the memory storing a plurality of additional instruction sets for a plurality of additional transactions.

5. The transaction staging booth as in claim 1 wherein the transaction interface is configured to provide the first instruction set in a plurality of languages, and to selectively provide the first instruction set to the user in a user-selected language from the plurality of languages.

6. The transaction staging booth as in claim 1 wherein the transaction interface comprises a speaker coupled to an audio source for audibly providing the first instruction set to the user.

7. The transaction staging booth as in claim 1 further comprising a privacy shield extending directly from the staging surface.

8. The transaction staging booth as in claim 7 wherein the privacy shield extends from a periphery of the staging surface, and extends at least one-half of the way around the periphery.

9. The transaction staging booth as in claim 7 wherein the privacy shield further comprises at least one receptacle to hold a paper version of the first instruction set.

10. The transaction staging booth as in claim 1 further comprising a second transaction interface.

11. The transaction staging booth as in claim 10 wherein the transaction interface and the second transaction interface are selected from a telephone, a screen, a speaker, and a braille pattern.

12. The transaction staging booth as in claim 1 wherein the at least one leg comprises two spaced apart legs configured to receive there between a widest portion of the wheelchair.

13. The transaction staging booth as in claim 1 wherein the braille pattern comprises instructions for performing a financial transaction.

14. The transaction staging booth as in claim 1 wherein the braille pattern comprises instructions for use of a telephone.

15. The transaction staging booth as in claim 1 wherein the braille pattern comprises instructions for use of a user input device.

16. The transaction staging booth as in claim 1 wherein the braille pattern comprises instructions for use of a speaker.

17. The transaction staging booth as in claim 1 wherein the storage receptacle is accessible from a rear of the staging booth.

18. A transaction staging booth, comprising:

a staging surface, wherein the top side of the staging surface defines at least one receptacle to hold a paper version of a first instruction set, wherein the first instruction set comprises instructions for performing a financial transaction;

at least one leg to hold the staging surface to accommodate a user in a wheelchair when using the staging surface, wherein the at least one leg defines an opening under the staging surface, the opening configured to receive a lower portion of the wheelchair;

a storage receptacle extending directly from the underside of the staging surface, wherein the storage receptacle is configured to store objects simultaneous with the lower portion of the wheelchair being at least partially received in the opening;

a telephone; and a transaction interface to provide the first instruction set to the user, wherein the transaction interface comprises a second instruction set which includes a braille pattern on the staging surface, and wherein the braille pattern comprises at least a portion of the first instruction set.

19. The transaction staging booth as in claim 18 wherein the transaction interface comprises a screen configured to visually display at least a portion of the first instruction set to the user.

20. The transaction staging booth as in claim 18 wherein the transaction interface comprises a speaker configured to audibly provide at least a portion of the first instruction set to the user.

21. The transaction staging booth as in claim 18 wherein the transaction interface further comprises an input device to receive a user input related to the first instruction set.

22. The transaction staging booth as in claim 21 wherein the input device is configured to receive the user input identifying a desired language in which the first instruction set is to be provided.

23. The transaction staging booth as in claim 21 wherein the input device is configured to receive the user input identifying a desired financial transaction instruction set which is to be provided to the user.

24. A transaction staging booth, comprising:

a staging surface, wherein the top side of the staging surface defines at least one receptacle to hold a paper version of a first financial transaction instruction set;

a support structure coupled to the staging surface to hold the staging surface to accommodate a user in a wheelchair, wherein the support structure defines an opening under the staging surface, the opening configured to receive a lower portion of the wheelchair;

a storage receptacle extending directly from the underside of the staging surface, wherein the storage receptacle is configured to store objects simultaneous with the lower portion of the wheelchair being at least partially received in the opening;

a first transaction interface to audibly present the first financial transaction instruction set to the user;

a second transaction interface to visually present the first financial transaction instruction set to the user; and a third transaction interface comprising a second financial transaction instruction set which includes a braille pattern on the staging surface, wherein the braille pattern comprises at least a portion of the first financial transaction instruction set.

25. The transaction staging booth as in claim 24 further comprising a user input mechanism to receive an input from the user selecting the first transaction interface or the second transaction interface for providing the first financial transaction instruction set to the user.

26. The transaction staging booth as in claim 24 wherein the second transaction interface comprises a screen electrically coupled to a memory, the memory containing the first financial transaction instruction set, and the screen configured to visually display the first financial transaction instruction set.

27. The transaction staging booth as in claim 24 wherein the paper version of the first financial transaction instruction set is removably maintained in the at least one receptacle.

28. The transaction staging booth as in claim 24 wherein the staging booth rests on a surface, and wherein the staging surface is not parallel to the surface when the staging surface is coupled to the support structure.

* * * * *